United States Patent
Ando et al.

(10) Patent No.: US 11,609,327 B2
(45) Date of Patent: Mar. 21, 2023

(54) TARGET DETECTING DEVICE

(71) Applicants: Keito Ando, Gifu (JP); Hidenori Miyazaki, Aichi (JP); Hoshibumi Ichiyanagi, Aichi (JP); Naoki Fujiwara, Osaka (JP); Kazuo Yamamoto, Nara (JP)

(72) Inventors: Keito Ando, Gifu (JP); Hidenori Miyazaki, Aichi (JP); Hoshibumi Ichiyanagi, Aichi (JP); Naoki Fujiwara, Osaka (JP); Kazuo Yamamoto, Nara (JP)

(73) Assignee: Omron Corporation, Kyoto (JP)

( * ) Notice: Subject to any disclaimer, the term of this patent is extended or adjusted under 35 U.S.C. 154(b) by 1066 days.

(21) Appl. No.: 16/280,636

(22) Filed: Feb. 20, 2019

(65) Prior Publication Data
US 2019/0257946 A1 Aug. 22, 2019

(30) Foreign Application Priority Data
Feb. 20, 2018 (JP) .............................. JP2018-027736

(51) Int. Cl.
*G01S 17/04* (2020.01)
*G01S 7/481* (2006.01)
(Continued)

(52) U.S. Cl.
CPC ............. *G01S 17/04* (2020.01); *G01S 7/4817* (2013.01); *G01S 17/931* (2020.01); *G01S 7/022* (2013.01); *G01S 13/66* (2013.01); *G01S 13/88* (2013.01)

(58) Field of Classification Search
CPC .......... G01S 7/04; G01S 7/931; G01S 7/4817; G01S 7/022; G01S 13/66; G01S 13/88
(Continued)

(56) References Cited

U.S. PATENT DOCUMENTS

2007/0216878 A1 9/2007 Shoji et al.
2014/0293264 A1 10/2014 Miyazaki
(Continued)

FOREIGN PATENT DOCUMENTS

JP H10096624 A 4/1998
JP 2002071808 A 3/2002
(Continued)

OTHER PUBLICATIONS

Office Action issued in corresponding Japanese Application No. 2018-027736, dated Feb. 27, 2020 (6 pages).

*Primary Examiner* — Bo Fan
(74) *Attorney, Agent, or Firm* — Osha Bergman Watanabe & Burton LLP

(57) ABSTRACT

A target detecting device projects measuring light over a predetermined range in front of a vehicle, receives reflected light from a target, and detects the target or a distance to the target, based on a light reception signal output according to the light reception state. The light projecting unit includes a light emitting element emitting measuring light and light diffusion members. The light diffusion members are provided on an upper end portion and a lower end portion of a light projecting lens constituting part of a light projecting path, and diffuses, in the vertical direction, measuring light emitted from the light emitting element and traveling through the end portions in the vertical direction of the light traveling path while transmitting the measuring light.

7 Claims, 14 Drawing Sheets

(51) Int. Cl.
    *G01S 17/931*    (2020.01)
    *G01S 7/02*      (2006.01)
    *G01S 13/66*     (2006.01)
    *G01S 13/88*     (2006.01)

(58) Field of Classification Search
    USPC .............................................. 342/167, 25 A
    See application file for complete search history.

(56) References Cited

U.S. PATENT DOCUMENTS

2017/0122728 A1    5/2017  Kipfer et al.
2017/0131386 A1*   5/2017  Masuda ................ G01S 7/4817

FOREIGN PATENT DOCUMENTS

| JP | 2003121546 A | 4/2003 |
| JP | 2007248225 A | 9/2007 |
| JP | 2014-071029 A | 4/2014 |
| JP | 2014-209078 A | 11/2014 |
| JP | 2017090128 A | 5/2017 |
| JP | 2017173258 A | 9/2017 |
| JP | 2018004464 A | 1/2018 |

\* cited by examiner

TARGET DETECTING DEVICE

CROSS-REFERENCE TO RELATED APPLICATION

This application is based on Japanese Patent Application No. 2018-027736 filed with the Japan Patent Office on Feb. 20, 2018, the entire contents of which are incorporated herein by reference.

FIELD

The present invention relates to a target detecting device which projects measuring light from a light projecting unit, receives reflected light from a target with a light receiving unit, and detects the target or a distance to the target according to a light reception signal output from the light receiving unit.

BACKGROUND

For example, a target detecting device such as a laser radar is mounted on a vehicle having a collision prevention function. This target detecting device detects another vehicle, a person, a road, another object or the like existing in a traveling direction of the vehicle as a target and detects a distance to the target.

There are a radio target detecting device and an optical target detecting device. Among them, for example, each of JP 2014-71029 A and JP 2014-209078 A discloses an optical target detecting device including a light projecting unit that projects measuring light over a predetermined range, a light receiving unit that receives reflected light from a target in the predetermined range of the measuring light, and the like. The light projecting unit includes a light emitting element such as a laser diode and optical components such as a lens and a mirror. The light receiving unit includes optical components such as a lens and a mirror, and a light receiving element such as a photodiode.

In a target detecting device, it is required to extend the detection range of a target. In particular, in order to detect the presence or absence, the position, the type, and the like of a target located at a short distance, it is necessary to extend the detection range in order to grasp substantially entirety of the target. Therefore, for example, a plurality of light emitting elements and light receiving elements may be used in order to project measuring light and receive reflected light over and from a wide range. In addition, a scanning mirror that performs scanning with measuring light and reflected light in the horizontal direction and the vertical direction may be used.

For example, in JP 2014-71029 A, a scanning mirror (rotating body) having four reflecting surfaces is provided, and the respective reflecting surfaces are inclined at different angles with respect to the rotation axis of the scanning mirror. By rotating the scanning mirror about the rotation axis, measuring light (laser light) projected from the light emitting element (laser diode) is reflected by each reflecting surface and a predetermined range is scanned. Reflected light reflected by a target in the predetermined range is reflected by each reflecting surface and is guided to a corresponding light receiving element from among a plurality of light receiving elements (avalanche photodiodes). At this time, the predetermined range is scanned with the measuring light and the reflected light in the horizontal direction and in the vertical direction.

In addition to this, there is also a scanning mirror that performs scanning only with one of measuring light from the light emitting element and reflected light from the target in the horizontal direction or the vertical direction.

In addition, JP 2014-209078 A discloses that a light projecting optical system is provided between a light emitting element and a windshield of a vehicle. An incident surface (surface directed toward the light emitting element) of the light projecting optical system is configured of a single cylindrical lens. The entire incident surface functions as a collimator lens with respect to the horizontal direction. An outgoing surface (surface directed toward the windshield) of the light projecting optical system is configured of a light diffusion member (lenticular lens or lens array) in which a plurality of cylindrical lenses is arranged in the horizontal direction. Measuring light from the light emitting element is converted into parallel light in the horizontal direction on the incident surface of the light projecting optical system and then is diffused in a plurality of directions on a horizontal plane in the outgoing surface of the light projecting optical system, passes through the windshield, and is projected over a predetermined range in front of the vehicle. That is, the light diffusion member extends the light projecting range of the measuring light in the horizontal direction.

In a target detecting device, it is required not only to extend the detection range of a target located at a short distance (hereinafter referred to as a "short-distance target") but also to improve detection sensitivity of a target located at a long distance (hereinafter referred to as a "long-distance target". For example, by using a large number of light emitting elements or increasing the light-emitting power of the light emitting element, it is possible to extend the light projecting range of the measuring light to extend the detection range of the short-distance target. In addition, by increasing the light projection amount of measuring light, it is possible to improve detection sensitivity of the long-distance target. However, since the light emitting element is an expensive component among the constituent elements of the target detecting device, if a large number of light emitting elements are used, the cost increases. In addition, in a case where the light emitting power is set to the upper limit value in the current light emitting element, it is not possible to further increase the light-emitting power. Therefore, it is not possible to extend the detection range of the target or increase the detection sensitivity.

In addition, for example, as disclosed in JP 2014-209078, if measuring light emitted from the light emitting element is diffused by the light diffusion member, it is possible to extend the light projecting range of the measuring light with the light-emitting power of the current light emitting element without using a large number of light emitting elements. However, since the light projection amount of measuring light projected in each direction decreases, it becomes difficult to improve detection sensitivity of a long-distance target in particular.

SUMMARY

An object of the present invention is to provide a target detecting device capable of extending the detection range of a short-distance target and improving detection sensitivity of a long-distance target while reducing the number of light emitting elements to be used.

A target detecting device according to the present invention includes: a light projecting unit configured to project measuring light over a predetermined range; a light receiving unit configured to receive reflected light from a target in the predetermined range of the measuring light; and a detector configured to detect one of the target and a distance to the target, based on a light reception signal that the light receiving unit outputs according to a light reception state. The light projecting unit includes a light emitting element configured to emit the measuring light, and a light diffusion member configured to diffuse the measuring light emitted from the light emitting element while transmitting the measuring light. The light receiving unit includes a light receiving element configured to receive the reflected light from the target. The light diffusion member is provided at an end portion in one of a vertical direction and a horizontal direction of a light projecting path through which the measuring light travels.

According to the above, part of the measuring light emitted from the light emitting element, the part of the measuring light traveling through the end portion in the vertical direction or the horizontal direction of the light projecting path, is diffused in the vertical direction or the horizontal direction by the light diffusion member, and is projected over the predetermined range. Part of the measuring light emitted from the light emitting element, the part of the measuring light traveling through a central portion of the light projecting path, is projected over the predetermined range without being diffused by the light diffusion member. Therefore, it is possible to extend the light projecting range of the measuring light in the vertical direction or in the horizontal direction without using a large number of light emitting elements. In addition, since the light traveling through the central portion of the light projecting path is not diffused by the light diffusion member, it is possible to secure a large amount of the light traveling through the central portion. Further, since the light diffusion member diffuses part of the measuring light also to a center side of the light projecting path, it is possible to increase the light projection amount of the measuring light projected over the predetermined range from the central portion of the light projecting path. Therefore, it is possible to accurately grasp a target located at a long distance with the measuring light having a sufficient light amount, and to improve detection sensitivity of a long-distance target.

In the present invention, the light diffusion member may be provided on at least one of an upper end portion and a lower end portion of the light projecting path.

In addition, the target detecting device according to the present invention may further include a casing configured to house the light projecting unit and the light receiving unit, and a window provided on the casing so as to be open toward the predetermined range. The light projecting unit may further include at least one of a light projecting lens configured to convert the measuring light emitted from the light emitting element into parallel light in a predetermined direction, a scanning mirror configured to reflect the measuring light emitted from the light projecting lens to scan a predetermined range, and a transmission cover fitted so as to close the window of the casing and configured to transmit the measuring light reflected by the scanning mirror toward the predetermined range. The light diffusion member may be provided at the end portion in at least one of the light projecting lens, the scanning mirror, and the transmission cover.

In addition, in the present invention, the light diffusion member may be provided at the end portion on one of an incident surface and an outgoing surface of the measuring light in one of the light projecting lens and the transmission cover.

In addition, in the present invention, the scanning mirror has a reflecting region for light projection configured to reflect the projected light, and a reflecting region for light reception configured to reflect the reflected light. The light diffusion member may be provided at an end portion in the reflecting region for light projection.

In addition, in the present invention, the scanning mirror may perform scanning with the measuring light and the reflected light in the horizontal direction. A plurality of the light emitting elements and a plurality of the light receiving elements may be arranged in the vertical direction. The light diffusion member may diffuse, in the vertical direction, part of the measuring light emitted from the plurality of light emitting elements, the part of the measuring light traveling through the upper end portion and the lower end portion of the light projecting path.

In addition, in the present invention, the light diffusion member may be configured of a cylindrical lens having a curved surface.

In addition, in the present invention, a plurality of cylindrical lenses may be arranged in such a manner that the curved surfaces of the plurality of cylindrical lenses are continuous in a wave shape.

Further, in the present invention, curvatures of the plurality of cylindrical lenses may be different from each other, and the cylindrical lens located further away from a center of the light projecting path has a greater curvature.

According to the present invention, it is possible to provide a target detecting device capable of extending a detection range of a short-distance target and improving detection sensitivity of a long-distance target while reducing the number of light emitting elements to be used.

DETAILED DESCRIPTION

Figure 1:
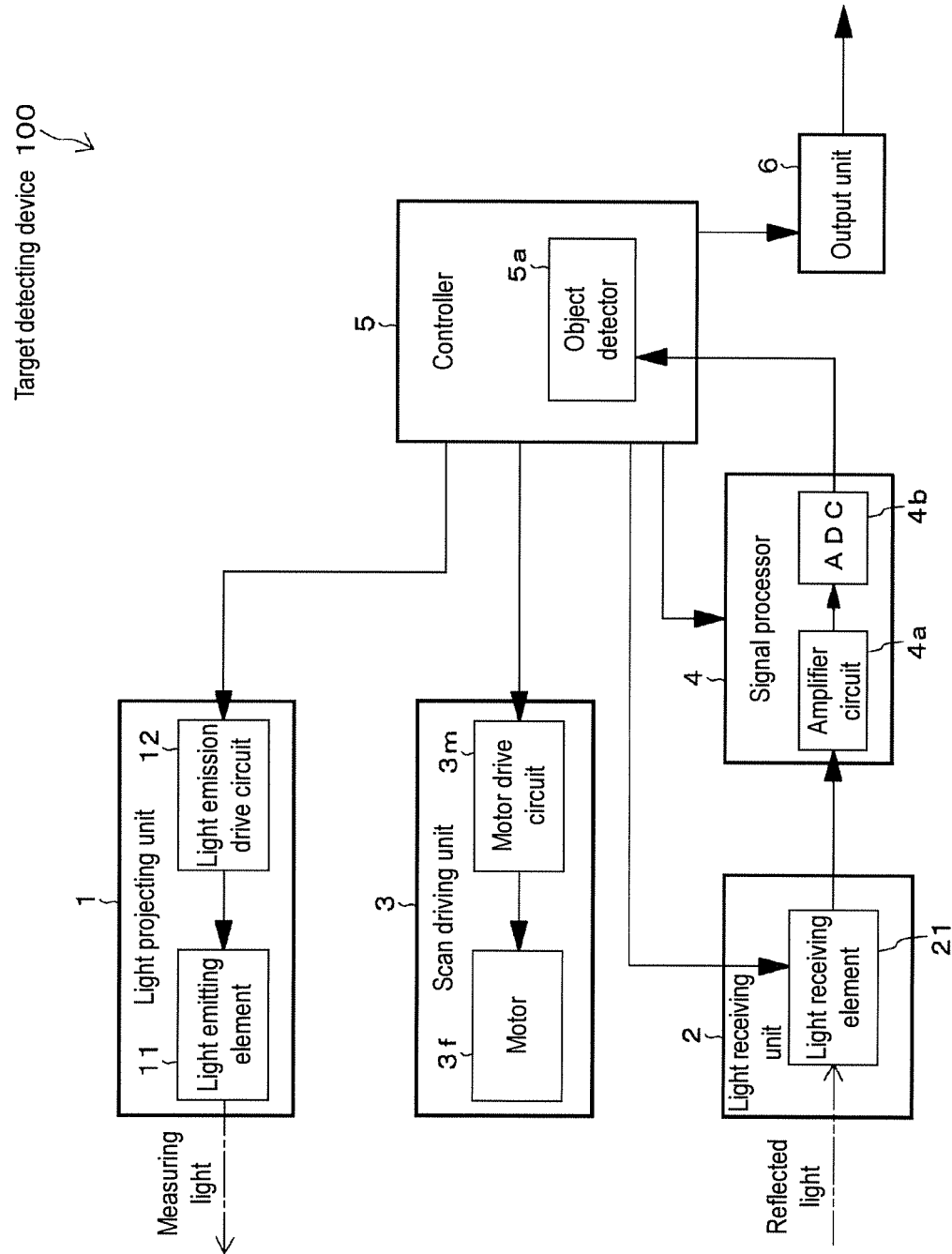
FIG. 1 is an electrical block diagram of a target detecting device according to an embodiment of the present invention.

Hereinafter, embodiments of the present invention will be described with reference to the drawings. In the drawings, identical or corresponding parts are denoted by identical reference signs.

Figure 2:
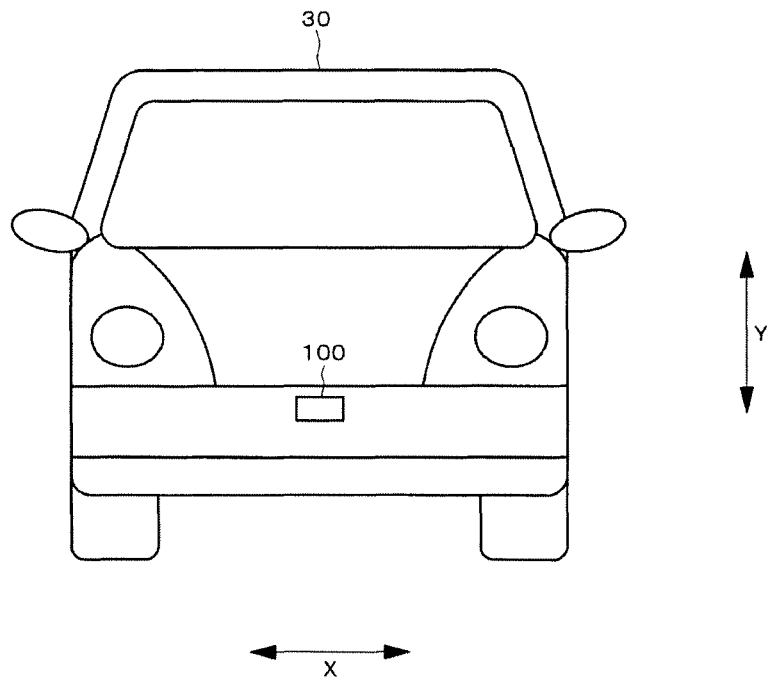
FIG. 2 is a front view of a vehicle on which the target detecting device of FIG. 1 is mounted.

FIG. 1 is an electrical block diagram of a target detecting device 100 according to an embodiment. FIG. 2 is a front view of a vehicle 30 on which the target detecting device 100 is mounted.

The target detecting device 100 is configured of a laser radar mounted on a vehicle. As illustrated in FIG. 2, the target detecting device 100 is installed at a front portion of the vehicle 30 configured of a four-wheeled automobile. The target detecting device 100 detects a target by projecting and receiving light over and from a predetermined range in front of the vehicle 30, and also detects a distance to the target. The target is another vehicle, a person, a road, or another object existing in a predetermined range in front of the vehicle 30.

As illustrated in FIG. 1, the target detecting device 100 includes a light projecting unit 1, a light receiving unit 2, a scan driving unit 3, a signal processor 4, a controller 5, and an output unit 6.

The light projecting unit 1 includes a light emitting element 11 and a light emission drive circuit 12. The light emitting element 11 is configured of an LD (laser diode) and emits light to project measuring light (laser light). The light emission drive circuit 12 supplies driving current to the light emitting element 11 to cause the light emitting element 11 to emit light. The light projecting unit 1 uses the light emission drive circuit 12 to cause the light emitting element 11 to emit light and projects measuring light over a predetermined range in front of the vehicle 30.

The light receiving unit 2 includes a light receiving element 21. The light receiving element 21 is configured of a PD (photodiode), receives light, and outputs a light reception signal (electric signal) corresponding to the light reception state. The measuring light projected from the light projecting unit 1 is reflected by a target in the predetermined range, and the light receiving unit 2 receives the reflected light with the light receiving element 21.

The scan driving unit 3 is configured of a motor 3f, a motor drive circuit 3m which drives the motor 3f, and the like. The motor 3f is an actuator for changing an orientation of a scanning mirror to be described later.

The signal processor 4 is configured of an amplifier circuit 4a, an ADC (analog-to-digital converter) 4b, and the like. The signal processor 4 causes the amplifier circuit 4a to amplify a light reception signal output from the light receiving element 21, then samples the amplified light reception signal at a predetermined cycle, causes the ADC 4b to convert the sampled light reception signal into a digital signal, and outputs the digital signal to the controller 5.

The controller 5 is configured of a microcomputer or the like, and controls operation of each unit of the target detecting device 100. The controller 5 includes an object detector 5a. According to an output signal from the signal processor 4, the object detector 5a detects the target and the distance to the target. The object detector 5a is an example of a "detector" according to the present invention.

Specifically, the object detector 5a compares an output signal from the signal processor 4 with a predetermined threshold. If the output signal is equal to or greater than the threshold, the object detector 5a determines that there is a target. If the output signal is less than the threshold, the object detector 5a determines that there is no target. In addition, the object detector 5a detects the maximum value of the output signal that is equal to or greater than the threshold, and detects the light reception time point of the reflected light from the target according to the maximum value. Then, the object detector 5a calculates the distance to the target according to the light reception time point of the reflected light and the emission time point of the measuring light from the light emitting element 11 (so-called TOF (Time of Flight) method).

The output unit 6 is configured of a circuit for outputting a signal and information to an ECU (electronic control device), not illustrated, mounted on the vehicle 30. The controller 5 causes the output unit 6 to output the detection result of the object detector 5a to the ECU.

Figure 3:
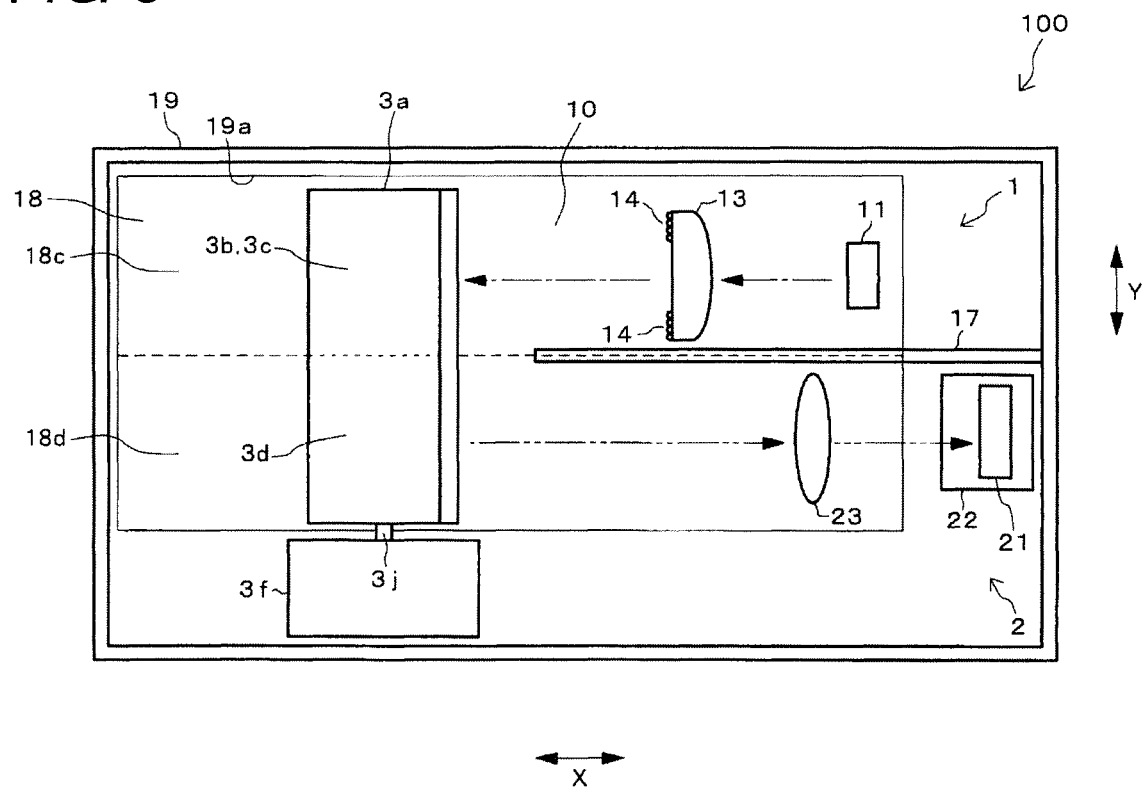
FIG. 3 is a rear view of an optical system of a target detecting device according to a first embodiment.
Figure 4A:
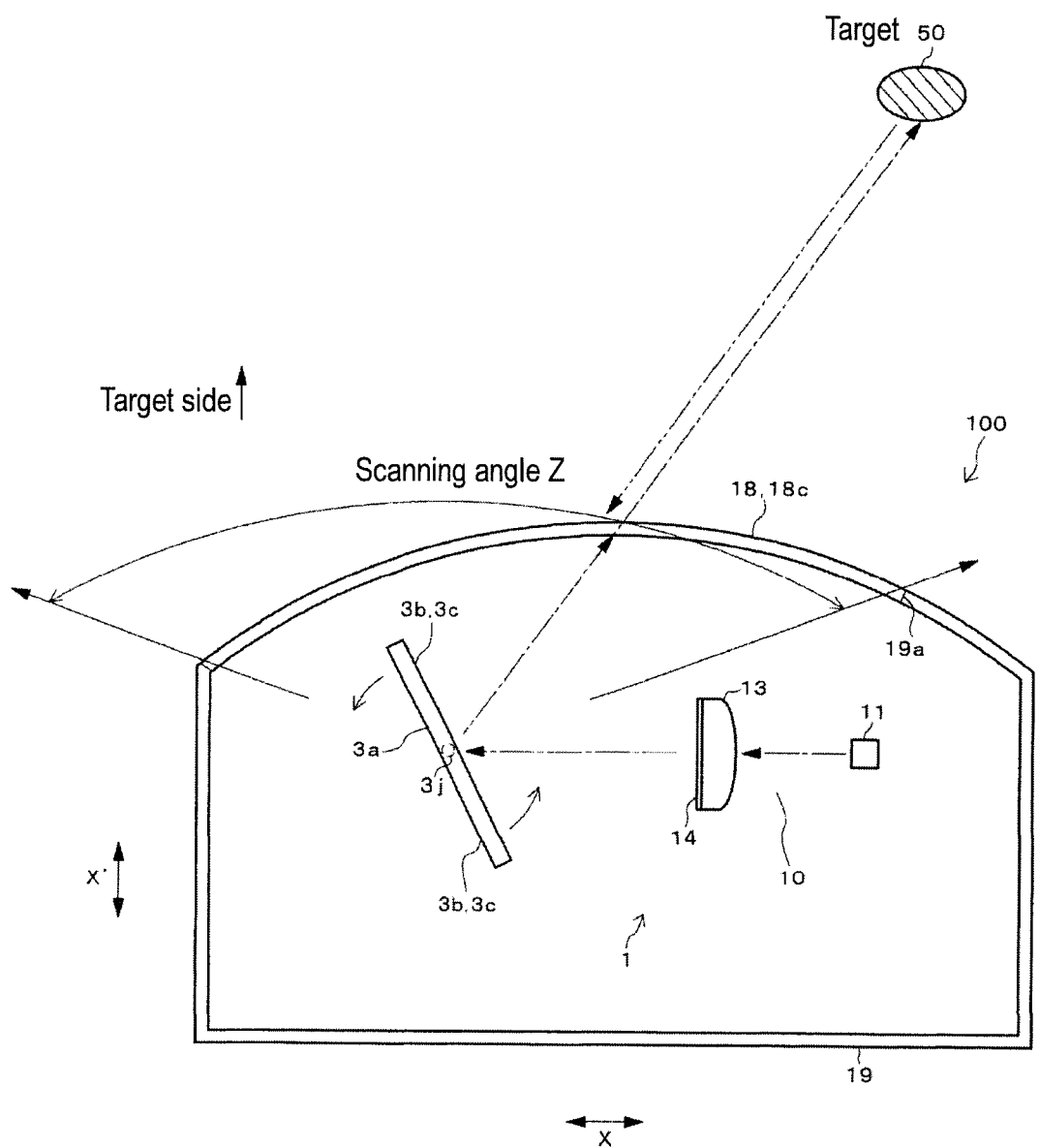
FIG. 4A is a top view of a light projecting unit of FIG. 3.
Figure 4B:
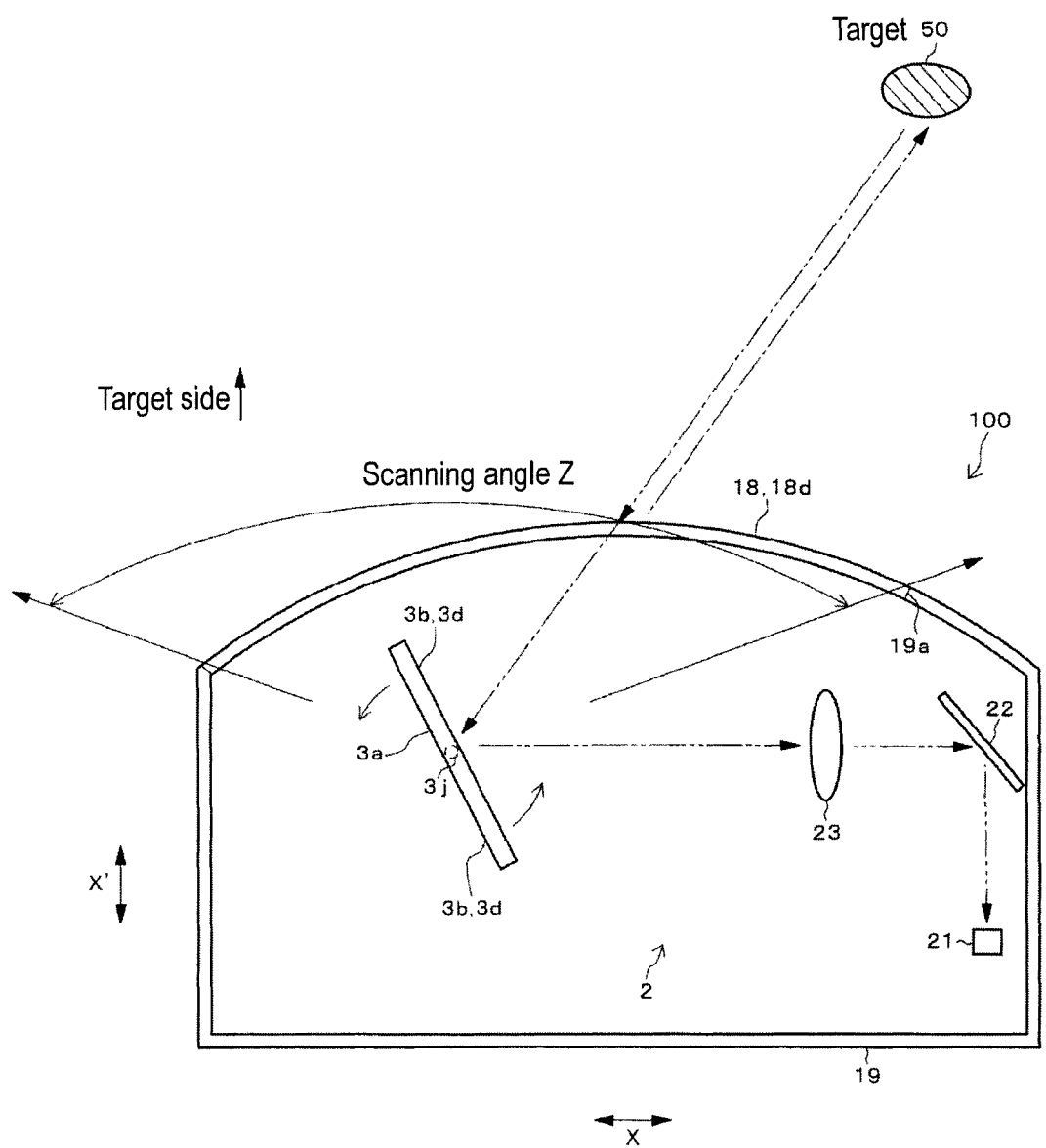
FIG. 4B is a top view of a light receiving unit of FIG. 3.

FIG. 3 is a view of an optical system of the target detecting device 100 according to the first embodiment as viewed from the rear (side opposite to a target 50 in FIG. 4A). FIG. 4A is a view of the light projecting unit 1 of FIG. 3 as viewed from above (upper side in FIG. 3). FIG. 4B is a view of the light receiving unit 2 of FIG. 3 as viewed from above. In FIGS. 3 to 4B, the orientation of a scanning mirror 3a is identical.

The optical system of the target detecting device 100 includes the light emitting element 11, a light projecting lens 13, a light diffusion member 14, the scanning mirror 3a, a transmission cover 18, a light receiving lens 23, a reflecting mirror 22, and the light receiving element 21.

Among them, the light emitting element 11, the light projecting lens 13, the light diffusion member 14, the scanning mirror 3a, and the transmission cover 18 constitute a light projecting optical system, and are included in the light projecting unit 1. The transmission cover 18, the scanning mirror 3a, the light receiving lens 23, the reflecting mirror 22, and the light receiving element 21 constitute a light receiving optical system, and are included in the light receiving unit 2.

As illustrated in FIGS. 3 to 4B, these optical systems are housed in a casing 19 of the target detecting device 100. The casing 19 is provided with a window 19a that opens toward the target 50. The transparent transmission cover 18 is fitted so as to close the window 19a.

The transmission cover 18 is made of a light-transmissive plate material. The transmission cover 18 has a transmission region 18c for light projection and a transmission region 18d for light reception. In this example, as illustrated in FIG. 3, the upper half of the transmission cover 18 is the transmission region 18c for light projection, and the lower half of the transmission cover 18 is the transmission region 18d for light reception. In FIG. 3, a broken line illustrated at the center of the transmission cover 18 is a virtual dividing line between the transmission region 18c for light projection and the transmission region 18d for light reception. The target detecting device 100 is installed at a front portion of the vehicle 30 such that the transmission cover 18 faces the predetermined range in front of the vehicle 30.

Figure 5:
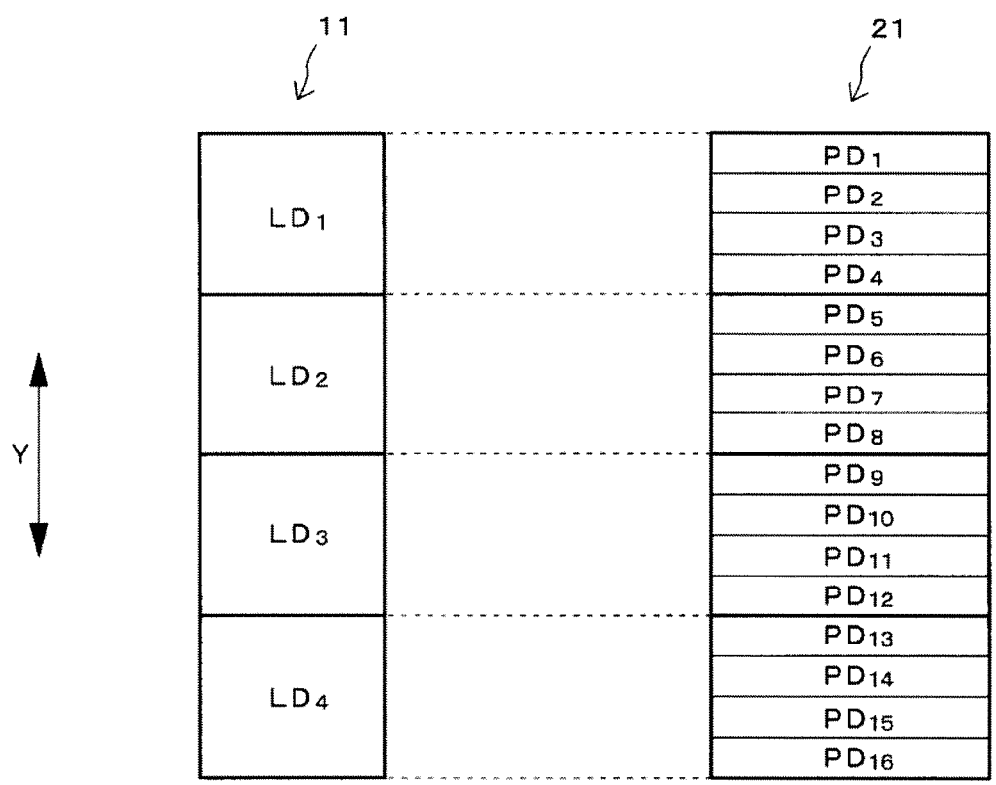
FIG. 5 is a diagram illustrating details of a light emitting element and a light receiving element in FIG. 3.

FIG. 5 is a diagram illustrating details of the light emitting element 11 and the light receiving element 21. The light emitting element 11 is configured of four laser diodes $LD_1$ to $LD_4$. These $LD_1$ to $LD_4$ are arranged in the vertical direction Y. In addition, the $LD_1$ to $LD_4$ are arranged in the casing 19 such that light emitting surfaces thereof are directed toward the scanning mirror 3a (FIGS. 3 and 4A).

As illustrated in FIG. 5, the light receiving element 21 is configured of 16 photodiodes $PD_1$ to $PD_{16}$. These $PD_1$ to $PD_{16}$ are arranged in the vertical direction Y. In addition, the $PD_1$ to $PD_{16}$ are arranged in the casing 19 such that the light receiving surfaces thereof are directed toward the reflecting mirror 22 (FIG. 4B). Four of the $PD_1$ to $PD_{16}$ correspond to one of the $LD_1$ to $LD_4$. More specifically, the $PD_1$ to $PD_4$ correspond to the $LD_1$, the $PD_5$ to $PD_8$ correspond to the $LD_2$, the $PD_9$ to $PD_{12}$ correspond to the $LD_3$, and the $PD_{13}$ to $PD_{16}$ correspond to the $LD_4$.

In FIG. 3 and the like, the light projecting lens 13 is configured of a collimator lens. The light projecting lens 13 is disposed between the light emitting element 11 and the scanning mirror 3a. The light diffusion member 14 is configured of a plurality of cylindrical lenses. The light diffusion member 14 is integrated with the light projecting lens 13.

The light receiving lens 23 is configured of a condenser lens. The reflecting mirror 22 is disposed so as to be inclined at a predetermined angle with respect to the light receiving lens 23 and the light receiving element 21 (FIG. 4B).

The scanning mirror 3a is formed in a plate shape. Both plate surfaces (front and rear surfaces) 3b of the scanning mirror 3a are reflecting surfaces. The scanning mirror 3a has a reflecting region 3c for light projection and a reflecting region 3d for light reception. The reflecting region 3c for light projection and the reflecting region 3d for light reception are located in an identical reflecting surface 3b. In this example, as illustrated in FIG. 3, the upper half of the reflecting surface 3b is the reflecting region 3c for light projection, and the lower half of the reflecting surface 3b is the reflecting region 3d for light reception. In FIG. 3, a dot line illustrated at the center of the scanning mirror 3a is a virtual dividing line between the reflecting region 3c for light projection and the reflecting region 3d for light reception.

The motor 3f is provided below the scanning mirror 3a. A rotary shaft 3j of the motor 3f is parallel to the vertical direction Y. A center shaft (not illustrated) of the scanning mirror 3a is fixed to the upper end of the rotary shaft 3j. The scanning mirror 3a rotates in conjunction with the rotary shaft 3j of the motor 3f.

The light emitting element 11, the light projecting lens 13, the light diffusion member 14, and the reflecting region 3c for light projection of the scanning mirror 3a are disposed in a light projecting space, which is approximately the upper half of the space inside the casing 19. The light receiving element 21, the reflecting mirror 22, the light receiving lens 23, and the reflecting region 3d for light reception of the scanning mirror 3a are disposed in a light receiving space, which is approximately the lower half of the space inside the casing 19. The light projecting space and the light receiving space in the casing 19 are separated by a light shielding plate 17. The scanning mirror 3a is disposed such that the reflecting region 3c for light projection and the reflecting region 3d for light reception face the transmission region 18c for light projection and the transmission region 18d for light reception of the transmission cover 18, respectively.

A light projecting path and a light receiving path during detection of the target 50 are as indicated by alternate long and short dash line arrows and two-dots chain line arrows, respectively, in FIGS. 3 to 4B. Specifically, as indicated by the alternate long and short dash line arrows in FIGS. 3 and 4A, measuring light emitted from the light emitting element 11 ($LD_1$ to $LD_4$ in FIG. 5) is converted into parallel light in a predetermined direction by the light projecting lens 13. At this time, the light diffusion member 14 diffuses part of the measuring light at end portions of the light projecting lens 13 (details will be described later). The measuring light having passed through the light projecting lens 13 hits the reflecting region 3c for light projection of any one of the reflecting surfaces 3b of the scanning mirror 3a. At this time, the motor 3f rotates, the orientation (angle) of the scanning mirror 3a changes, and the scanning mirror 3a is positioned at a predetermined angle at which one of the reflecting surfaces 3b is directed toward the target 50 (for example, the state of the scanning mirror 3a that FIGS. 3 to 4B illustrate). As a result, the measuring light is reflected by the reflecting region 3c for light projection of the scanning mirror 3a, and passes through the transmission region 18c for light projection of the transmission cover 18. Thus, a predetermined range outside the casing 19 is scanned. In FIGS. 3 and 4A, a light projecting path 10 (space) whose central axis are alternate long and short dash line arrows is formed between the light emitting element 11 and the scanning mirror 3a.

A scanning angle Z illustrated in FIG. 4A is a predetermined range (top view) over which the target detecting device 100 projects the measuring light emitted from the light emitting element 11 and reflected by the reflecting region 3c for light projection of the scanning mirror 3a.

As described above, the measuring light projected over the predetermined range from the target detecting device 100 is reflected by the target 50 in the predetermined range. As indicated by the two-dots chain line arrows in FIGS. 4A and 4B, the reflected light travels toward the target detecting device 100, passes through the transmission region 18d for light reception of the transmission cover 18, and hits the reflecting region 3d for light reception of one of the reflecting surfaces 3b of the scanning mirror 3a (FIG. 4B). At this time, the motor 3f rotates, the orientation of the scanning mirror 3a changes, and the scanning mirror 3a is positioned at a predetermined angle at which one of the reflecting surfaces 3b is directed toward the target 50 (for example, the state of the scanning mirror 3a that FIGS. 3 to 4B illustrate). As a result, the reflected light from the target 50 is reflected by the reflecting region 3d for light reception of the scanning mirror 3a and enters the light receiving lens 23. Then, the reflected light is condensed by the light receiving lens 23, is reflected by the reflecting mirror 22, and is received by the light receiving element 21. That is, the scanning mirror 3a scans reflected light from the target 50 and guides the reflected light to the light receiving element 21 via the light receiving lens 23 and the reflecting mirror 22. In addition, measuring light emitted from the respective $LD_1$ to $LD_4$ and is reflected by the target 50 is received by the corresponding $PD_1$ to $PD_{16}$.

A scanning angle Z illustrated in FIG. 4B is a predetermined range (top view) in which the reflected light from the target 50 is reflected by the reflecting region 3d for light reception of the scanning mirror 3a and then is received by the light receiving element 21. In this example, the scanning angle Z illustrated in FIG. 4A is equal to the scanning angle Z illustrated in FIG. 4B. The scanning angle Z is also a detection range in the horizontal direction of the target detecting device 100 for the target 50.

Figure 6A:
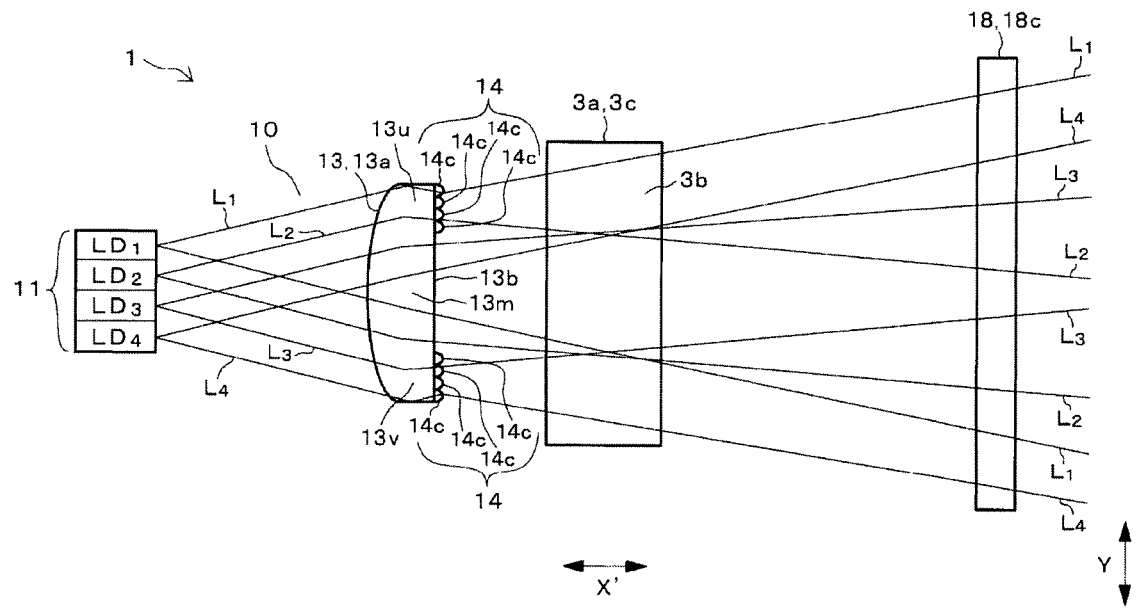
FIGS. 6A and 6B are views illustrating the light projecting unit and a light projection state according to the first embodiment, respectively.
Figure 6B:
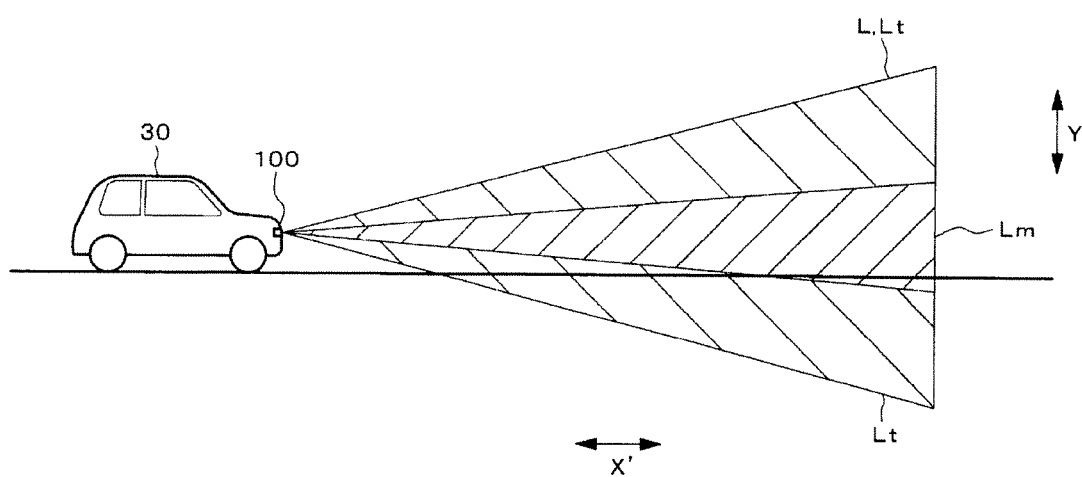
Figure 7A:
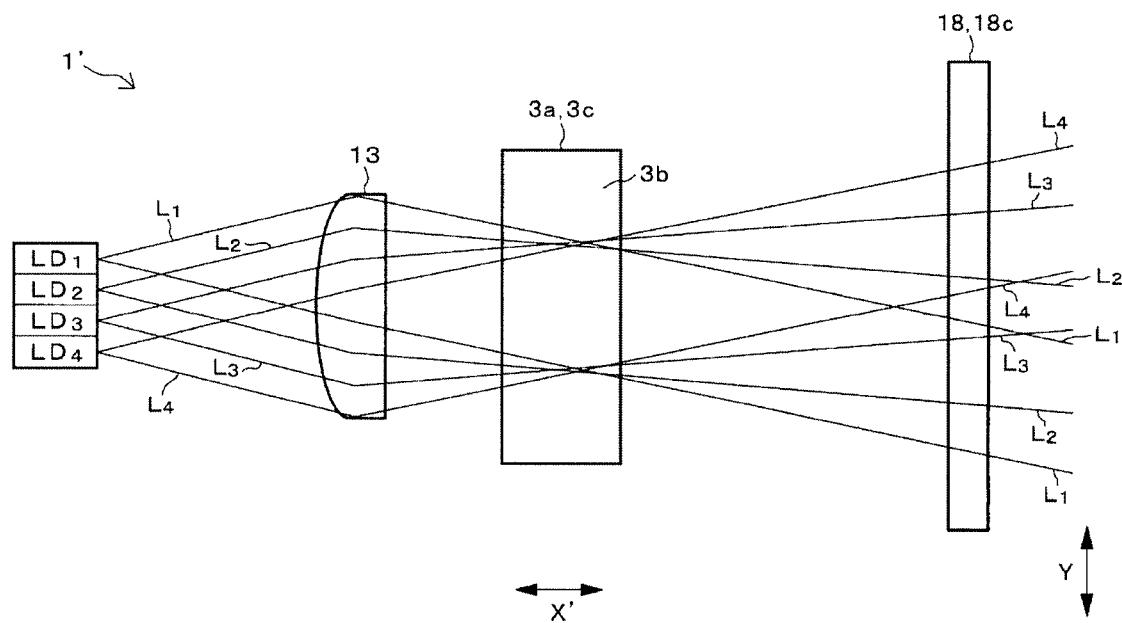
FIGS. 7A and 7B are views illustrating a conventional light projecting unit and a conventional light projection state, respectively.
Figure 7B:
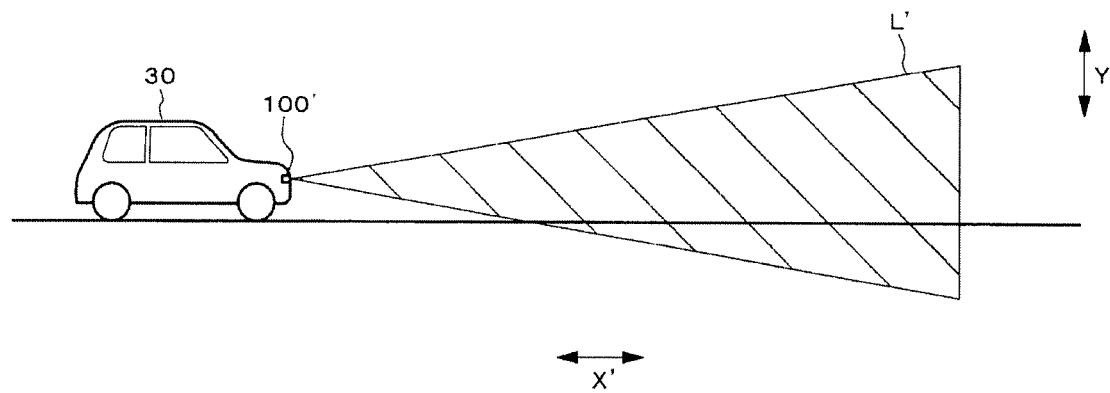
Figure 8A:
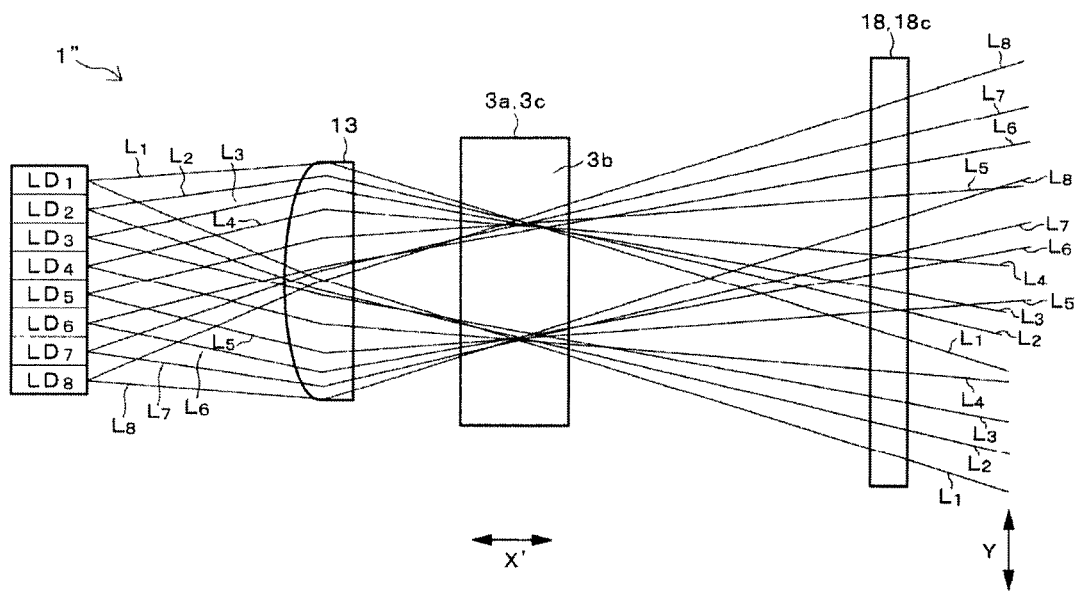
FIGS. 8A and 8B are views illustrating a conventional light projecting unit and a conventional light projection state, respectively.
Figure 8B:
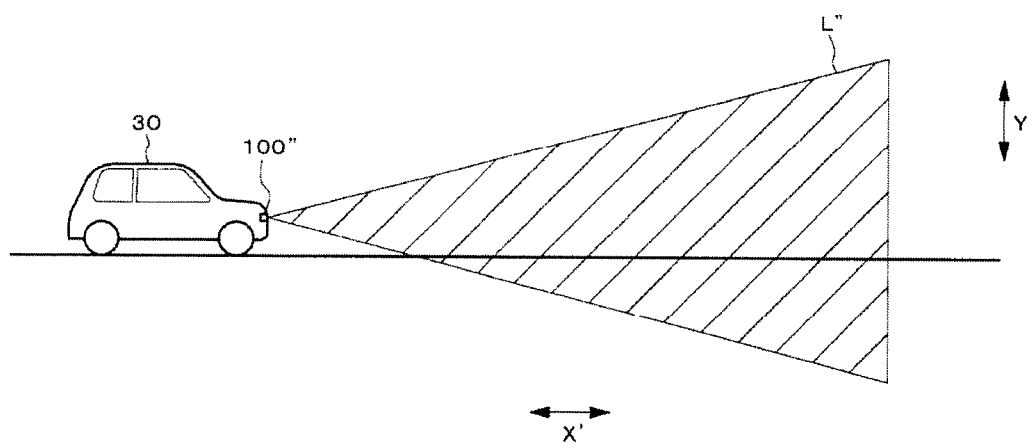

FIGS. 6A and 6B are views illustrating the light projecting unit 1 and a light projection state of the target detecting device 100 according to the first embodiment, respectively. FIGS. 7A, 7B and 8A, 8B are views illustrating conventional light projecting units 1', 1" and conventional light projection states of target detecting devices 100', 100", respectively. FIGS. 6A, 7A, and 8A schematically illustrate the side view of the light projecting units 1, 1', 1", respectively. FIGS. 6B, 7B, and 8B schematically illustrate light projection states of the target detecting devices 100, 100', 100", respectively.

In the conventional light projecting unit 1' illustrated in FIG. 7A, four $LD_1$ to $LD_4$ are arranged in the vertical direction Y as a light emitting element. Measuring light $L_1$ to $L_4$ emitted from the respective $LD_1$ to $LD_4$ are converted into parallel light in a predetermined direction by a light projecting lens 13, then is reflected by a reflecting region 3c for light projection on a reflecting surface 3b of a scanning mirror 3a, passes through a transmission region 18c for light projection of a transmission cover 18, and is projected in front of a vehicle 30. At this time, each of the measuring light $L_1$ emitted from the uppermost $LD_1$ and the measuring light $L_2$ emitted from the second $LD_2$ from the top is projected in a diagonally downward direction inclined at a predetermined angle with respect to the horizontal direction X'. The light projection angle of the measuring light $L_2$ with respect to the horizontal direction X' is set to be smaller than the light projection angle of the measuring light $L_1$ with respect to the horizontal direction X'. In addition, each of the measuring light $L_4$ emitted from the lowermost $LD_4$ and measuring light $L_3$ emitted from the second $LD_3$ from the bottom is projected in a diagonally upward direction inclined at a predetermined angle with respect to the horizontal direction X'. The light projection angle of the measuring light $L_3$ with respect to the horizontal direction X' is set to be smaller than the light projection angle of the measuring light $L_4$ with respect to the horizontal direction X'.

In addition, the light projecting ranges of the measuring light $L_1$ to $L_4$ are set so as to partially overlap with one another in the vertical direction Y. Further, light-emitting powers of the respective $LD_1$ to $LD_4$ are set to upper limit values which are approximately equal to one another. Therefore, in the conventional target detecting device 100' including the light projecting unit 1', the light projecting range (hatched part) of the measuring light L' extends in front of the vehicle 30 as illustrated in FIG. 7B. In addition, since only four LDs ($LD_1$ to $LD_4$) are used, the light projection amount of measuring light L' in each direction is small, and it is difficult to increase detection sensitivity of a long-distance target.

In the conventional light projecting unit 1" illustrated in FIG. 8A, eight LDs ($LD_1$ to $LD_8$) are arranged in the vertical direction Y as a light emitting element. Measuring light $L_1$ to La emitted from the respective $LD_1$ to $LD_8$ are converted into parallel light in a predetermined direction by a light projecting lens 13, then is reflected by a reflecting region 3c for light projection on a reflecting surface 3b of a scanning mirror 3a, passes through a transmission region 18c for light projection of a transmission cover 18, and is projected in front of a vehicle 30. At this time, each of measuring light $L_1$ to $L_4$ emitted from the upper four $LD_1$ to $LD_4$ is projected in a diagonally downward direction inclined at a predetermined angle with respect to the horizontal direction X'. The light projection angles of the measuring light $L_1$ to $L_4$ with respect to the horizontal direction X' are set such that the light projection angles are smaller as the positions of the $LD_1$ to $LD_4$ which are projection sources are lower. In addition, the light projecting lens 13 projects each of measuring light $L_5$ to $L_8$ emitted from the lower four $LD_5$ to $LD_8$ in a diagonally upward direction inclined at a predetermined angle with respect to the horizontal direction X'. The light projection angles of the measuring light $L_5$ to $L_8$ with respect to the horizontal direction X' are set such that the light projection angles are smaller as the positions of the $LD_5$ to $LD_8$ which are projection sources are upper.

In addition, the light projecting ranges of the measuring light $L_1$ to $L_8$ are set so as to partially overlap with one another in the vertical direction Y. Further, light-emitting powers of the respective $LD_1$ to $LD_8$ are set to upper limit values which are approximately equal to one another. Therefore, in the conventional target detecting device 100" including the light projecting unit 1", the light projecting range (hatched part) of the measuring light L" extends in front of the vehicle 30 as illustrated in FIG. 8B. In addition, since eight LDs ($LD_1$ to $LD_8$) are used, the light projecting range of the measuring light L" in front of the vehicle 30 is wider than the projecting range of the measuring light L' in FIG. 7B. Further, since the light projection amount of the measuring light L" is greater than the light projection amount of the measuring light L' illustrated in FIG. 7B, detection sensitivity of a long-distance target can be improved. However, since as many as eight LDs are used, the product cost of the target detecting device 100" increases.

In contrast, in the light projecting unit 1 of the target detecting device 100 according to the present invention, as illustrated in FIG. 6A, four LDs ($LD_1$ to $LD_4$) are arranged as the light emitting element 11 in the vertical direction Y and the light diffusion members 14 are provided in the light projecting path 10 of the measuring light $L_1$ to $L_4$ emitted from the respective $LD_1$ to $LD_4$.

The light diffusion member 14 is integrated with an upper end portion 13u and a lower end portion 13v of the outgoing surface 13b of the light projecting lens 13. Since the measuring light $L_1$ to $L_4$ emitted from the $LD_1$ to $LD_4$ of the light emitting element 11 pass through the light projecting lens 13, the light projecting lens 13 constitutes part of the light projecting path 10 through which the measuring light $L_1$ to $L_4$ travel. Each of the measuring light $L_1$ to $L_4$ passes through a central portion 13m and the end portions 13u, 13v of the light projecting lens 13. The light diffusion member 14 is not provided in the central portion 13m but is provided in each of the end portions 13u, 13v. The end portions 13u, 13v are also end portions of the light projecting path 10 in the vertical direction Y.

The light diffusion member 14 is configured of a plurality of cylindrical lenses 14c. Each cylindrical lens 14c has a convex curved surface projecting in the light traveling direction (rightward direction in FIG. 6A). The plurality of cylindrical lenses 14c is arranged in the vertical direction Y such that the curved surfaces thereof are continuous in a wave shape.

The projection states of the measuring light $L_1$ to $L_4$ from the $LD_1$ to $LD_4$ to the light projecting lens 13 are similar to those in the case of FIG. 7A. However, part of the measuring light $L_1$ to $L_4$ entering the light projecting lens 13, the part of the measuring light $L_1$ to $L_4$ traveling through the end portions 13u, 13v of the light projecting lens 13, enters the light diffusion member 14. The light diffusion member 14 diffuses, in the vertical direction Y, the light which has entered while transmitting the light. The measuring light $L_1$ to $L_4$ diffused by the light diffusion member 14 is reflected by the reflecting region 3c for light projection of the scanning mirror 3a, passes through the transmission region 18c for light projection of the transmission cover 18, and is projected in front of the vehicle 30.

In contrast, part of the measuring light $L_1$ to $L_4$ which has entered the light projecting lens 13, the part of light traveling through the central portion 13m of the light projecting lens 13, does not enter the light diffusion member 14 but is reflected by the reflecting region 3c for light projection of the scanning mirror 3a, passes through the transmission region 18c for light projection of the transmission cover 18, and is projected in front of the vehicle 30.

Due to the light projection state of the light projecting unit 1 as described above, in the target detecting device 100, the light projecting range (hatched part) of the measuring light L extends in front of the vehicle 30 as illustrated in FIG. 6B. That is, since the light diffusion member 14 diffuses part of the measuring light $L_1$ to $L_4$ in the vertical direction Y, the light projecting range of the measuring light L is wider in the vertical direction Y than the light projecting range of the measuring light L' of the conventional target detecting device 100' that FIG. 7B illustrates. In this example, the light projecting range of the measuring light L is set to be approximately identical to the light projecting range of the measuring light L" of the conventional target detecting device 100" that FIG. 8B illustrates. In addition, even though eight LDs are used in the conventional light projecting unit 1" of FIG. 8A, only four LDs are used in the light projecting unit 1 of the present invention as illustrated in FIG. 6A. Therefore, the product cost of the target detecting device 100 is reduced by the amount corresponding to the reduced number of LDs to be used.

In addition, measuring light Lm which is part of the measuring light L in FIG. 6B and is projected on the central portion of the light projecting range is configured of measuring light that is not diffused by the light diffusion member 14 but passes through the central portion 13m of the light projecting lens 13 and measuring light diffused to a center side of the light projecting path 10 by the light diffusion member 14. In contrast, measuring light Lt projected to a portion other than the central portion of the light projecting range is configured of measuring light diffused by the light diffusion member 14. Therefore, the light projection amount of the measuring light Lm in the central portion is greater than the light projection amount of the measuring light Lt in the portion other than the central portion, and is greater than the projection light amount of the measuring light L' in each direction in FIG. 7B. Therefore, it is possible to improve detection sensitivity of a long-distance target. In this example, the light projection amount of the measuring light Lm is set to be approximately identical to the light projection amount of the measuring light L" in each direction of the conventional target detecting device 100" that FIG. 8B illustrates.

The measuring light Lm in FIG. 6B is suitable for grasping a long-distance target, that is, a target such as a preceding vehicle, an oncoming vehicle, or another object located at a long distance from the vehicle 30. In contrast, the measuring light Lt is suitable for grasping a short-distance target, that is, entirety of a target such as a person, a road surface, or another object located at a short distance from the vehicle 30.

According to the above-described first embodiment, part of the measuring light $L_1$ to $L_4$ emitted from the $LD_1$ to $LD_4$ of the light emitting element 11, the part of the measuring light $L_1$ to $L_4$ traveling through the end portions of the light projecting path 10 (the end portions 13u, 13v of the light projecting lens 13), is diffused in the vertical direction Y by the light diffusion member 14, and is projected over the predetermined range. In addition, light traveling through the central portion of the light projecting path 10 (the central portion 13m of the light projecting lens 13) is projected over the predetermined range without being diffused by the light diffusion member 14. Therefore, even if a large number of the light emitting elements 11 are not arranged in the vertical direction Y, the light projecting range of the measuring light L extends in the vertical direction Y, and the detection range of the target 50 also extends in the vertical direction Y. Therefore, it is possible to grasp almost entirety of the target 50 at a short distance and to improve detection performance of a short-distance target. In addition, it is also possible to reduce the number of $LD_1$ to $LD_4$ to be used and to keep the product cost of the target detecting device 100 low.

Further, part of the measuring light $L_1$ to $L_4$ emitted from the $LD_1$ to $LD_4$, the part of the measuring light $L_1$ to $L_4$ traveling through the central portion of the light projecting path 10, is not diffused by the light diffusion member 14. Therefore, a large amount of the light can be secured. Further, since the light diffusion member 14 diffuses part of the measuring light $L_1$ to $L_4$ also to the center side of the light projecting path 10, it is possible to increase the light projection amount of the measuring light Lm projected over the predetermined range from the central portion of the light projecting path 10. Therefore, it is possible to accurately grasp the target 50 located at a long distance with the measuring light Lm having a sufficient light amount, and to improve detection sensitivity of a long-distance target.

In addition, in the first embodiment, the light diffusion member 14 is integrated with the end portions 13u, 13v of the outgoing surface 13b of the light projecting lens 13 that the light projecting unit 1 includes. Therefore, the light diffusion member 14 and the light projecting lens 13 can be easily disposed on the light projecting path 10 of the light projecting unit 1. Further, by integrating the light diffusion member 14 and the light projecting lens 13, it is possible to suppress an increase in the number of constituent components of the light projecting unit 1 and to facilitate assembly of the target detecting device 100.

In addition, in the first embodiment, without arranging a large number of the light emitting elements 11 and a large number of the light receiving elements 21 in the horizontal direction X, it is possible to use the scanning mirror 3a to perform scanning with measuring light and reflected light in the horizontal direction X and to extend the light projecting and receiving range in the horizontal direction X. Therefore, it is possible to extend the detection range of the target 50 in the horizontal direction X and the vertical direction Y while reducing the number of light emitting elements 11 and light receiving elements 21 to be used and keeping the product cost of the target detecting device 100 low.

In addition, in the first embodiment, since the scanning mirror 3a that performs scanning with measuring light and reflected light only in the horizontal direction X is used, the configuration is simpler than the configuration in the case of using a scanning mirror that performs scanning with measuring light and reflected light in the horizontal direction X and the vertical direction Y, and the product cost of the target detecting device 100 can be reduced.

Further, in the first embodiment, the light diffusion member 14 is configured of the cylindrical lenses 14c each having a convex curved surface. The plurality of cylindrical lenses 14c is arranged at the end portions 13u, 13v of the outgoing surface 13b of the light projecting lens 13 such that the curved surfaces of the respective cylindrical lenses 14c are continuous in a wave shape in the vertical direction Y. Therefore, the measuring light $L_1$ to $L_4$ passing through the end portions 13u, 13v of the light projecting lens 13 are widely diffused in the vertical direction Y by the plurality of cylindrical lenses 14c, and the light projecting range of the measuring light L in front of the vehicle 30 can be further extended.

Figure 9:
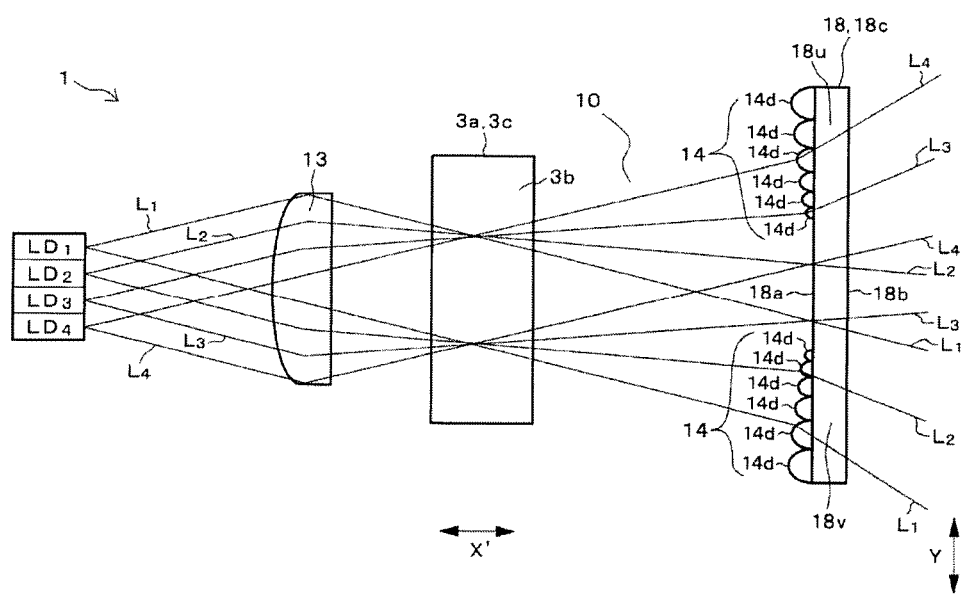
FIG. 9 is a view illustrating a light projecting unit according to a second embodiment.

FIG. 9 is a view illustrating a light projecting unit 1 according to a second embodiment. Since the configuration other than the light projecting unit 1 is similar to that of the first embodiment, illustration thereof is omitted (the same applies to third to seventh embodiments to be described later). In the second embodiment, light diffusion members 14 are integrated with an upper end portion 18u and a lower end portion 18v of an incident surface 18a of light in a light transmission region 18c for light projection of a transmission cover 18. Measuring light $L_1$ to $L_4$ emitted from $LD_1$ to $LD_4$ passes through the light transmission region 18c for light projection and is projected in front of a vehicle 30. Therefore, the light transmission region 18c for light projection constitutes part of a light projecting path 10 of the measuring light $L_1$ to $L_4$. Each of the measuring light $L_1$ to $L_4$ passes through a central portion and end portions 18u, 18v in the transmission region 18c for light projection. The light diffusion member 14 is not provided in the central portion but is provided in each of the end portions 18u, 18v. The end portions 18u, 18v are also end portions of the light projecting path 10 in the vertical direction Y.

In addition, the light diffusion member 14 is configured of a plurality of cylindrical lenses 14d. Each cylindrical lens 14d has a convex curved surface projecting in the direction opposite to the light traveling direction (leftward direction in FIG. 9). The plurality of cylindrical lenses 14d is arranged in the vertical direction Y such that the curved surfaces thereof are continuous in a wave shape. In addition, curvatures of the plurality of cylindrical lenses 14d are different from each other, and the cylindrical lens located further away in the vertical direction from the center of the transmission region 18c for light projection has a greater curvature.

Measuring light $L_1$ to $L_4$ emitted from the $LD_1$ to $LD_4$ is converted into parallel light in a predetermined direction by a light projecting lens 13, then is reflected by a reflecting region 3c for light projection of a scanning mirror 3a. Then, part of the measuring light $L_1$ to $L_4$, the part of the measuring light $L_1$ to $L_4$ traveling through upper and lower end portions of the light projecting path 10, enters the light diffusion member 14, is diffused in the vertical direction Y by the light diffusion member 14, passes through the light transmission region 18c for light projection of the transmission cover 18 and is projected in front of the vehicle 30. In addition, part of the measuring light $L_1$ to $L_4$ reflected by the reflecting region 3c for light projection of the scanning mirror 3a, the part of the measuring light $L_1$ to $L_4$ traveling through a central portion of the light projecting path 10 does not enter the light diffusion member 14 but passes through the transmission region 18c for light projection of the transmission cover 18, and is projected in front of the vehicle 30.

Even if the light projecting unit 1 according to the second embodiment as described above is provided in the target detecting device 100, the light projection state of the measuring light L as illustrated in FIG. 6B can be realized in front of the vehicle 30. In addition, the curvatures of the plurality of cylindrical lenses 14d constituting light diffusion member 14 are different from each other, and cylindrical lens 14d located further away in the vertical direction from the center of the transmission region 18c for light projection has a greater curvature. Therefore, the diffusion degrees of the measuring lights $L_1$ to $L_4$ can be set to gradually increase in the vertical direction Y. The light projecting range of the measuring light L projected in front of the vehicle 30 can easily be extended in the vertical direction Y. In addition, it is also possible to secure a large light projection amount of the measuring light Lm (FIG. 6B) projected on the central portion of the light projecting range of the measuring light L and to gradually decrease the light projection amount of the measuring light L as the measuring light L separates further away in the vertical direction from the central portion.

Figure 10A:
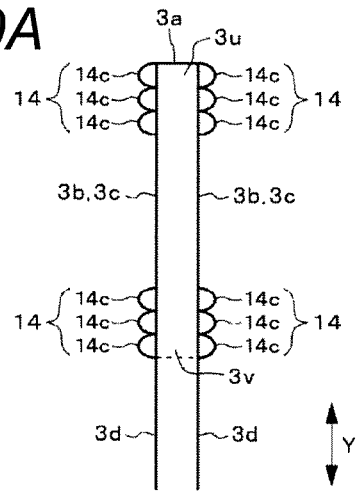
FIGS. 10A to 10C are views each illustrating a scanning mirror and a light diffusion member according to a third embodiment.
Figure 10B:
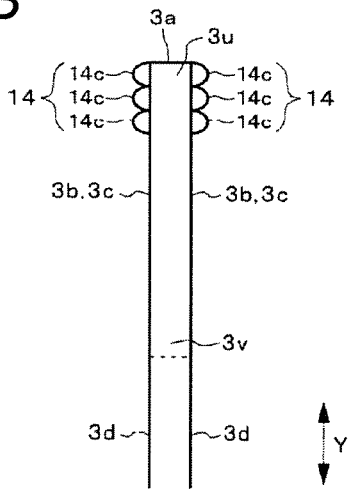
Figure 10C:
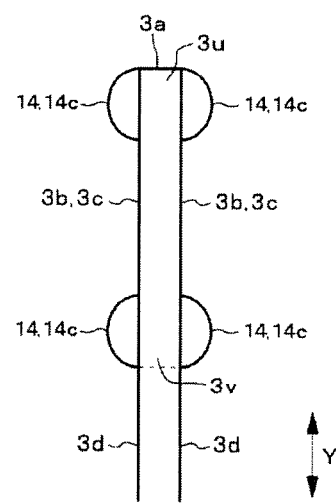

FIGS. 10A to 10C are views each illustrating a scanning mirror 3a and a light diffusion member 14 according to a third embodiment. In the example illustrated in FIG. 10A, light diffusion members 14 are integrated with end portions 3u, 3v in the vertical direction Y in a reflecting region 3c for light projection of each reflecting surface 3b of the scanning mirror 3a. That is, light diffusion members 14 are provided on the front and rear surfaces of the scanning mirror 3a. Even in this case, part of the measuring light $L_1$ to $L_4$ emitted from the $LD_1$ to $LD_4$, the part of the measuring light $L_1$ to $L_4$ traveling through upper and lower end portions of a light projecting path 10, is diffused in the vertical direction Y by the light diffusion members 14. Therefore, a light projecting range of the measuring light L in front of a vehicle 30 can be extended in the vertical direction Y.

Note that in the example of FIG. 10A, since the light diffusion members 14 are provided at the upper and lower end portions 3u, 3v of the reflecting regions 3c for light projection, the measuring light $L_1$ to $L_4$ is diffused on the lower sides of the reflecting regions 3c for light projection to become stray light, and the stray light enters a light receiving path of reflected light from a target 50, which may affect detection performance of the target 50. As a countermeasure against this, as illustrated in FIG. 10B, the light diffusion members 14 are not provided at lower ends 3v of reflecting regions 3c for light projection near reflecting regions 3d for light reception, and the light diffusion members 14 may be provided only at upper end portions 3u of the reflecting regions 3c for light projection located away from the reflecting regions 3d for light reception. In addition, for example, in order to reliably detect a road surface on which the vehicle 30 travels, the light diffusion members 14 may be provided only at lower end portions 3v of reflecting regions 3c for light projection (not illustrated).

Further, as illustrated in FIG. 10C, the light diffusion members 14 each configured of a single cylindrical lens 14c may be provided at upper end portions 3u or lower end portions 3v of reflecting regions 3c for light projection.

Figure 11A:
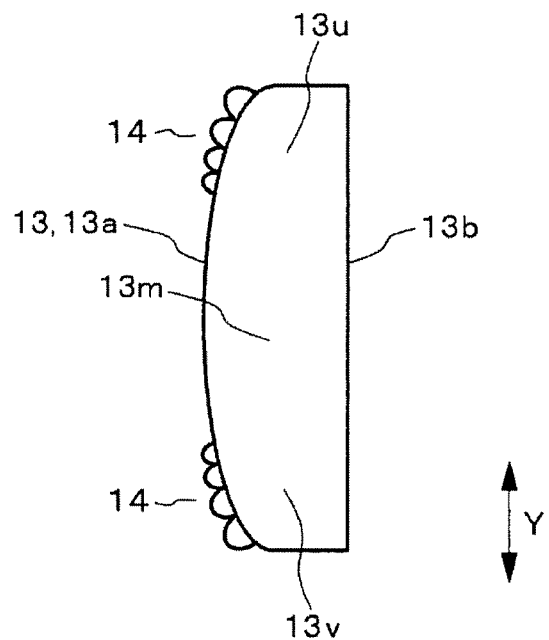
FIGS. 11A and 11B are views illustrating a light projecting lens and a light diffusion member according to a fourth embodiment.
Figure 11B:
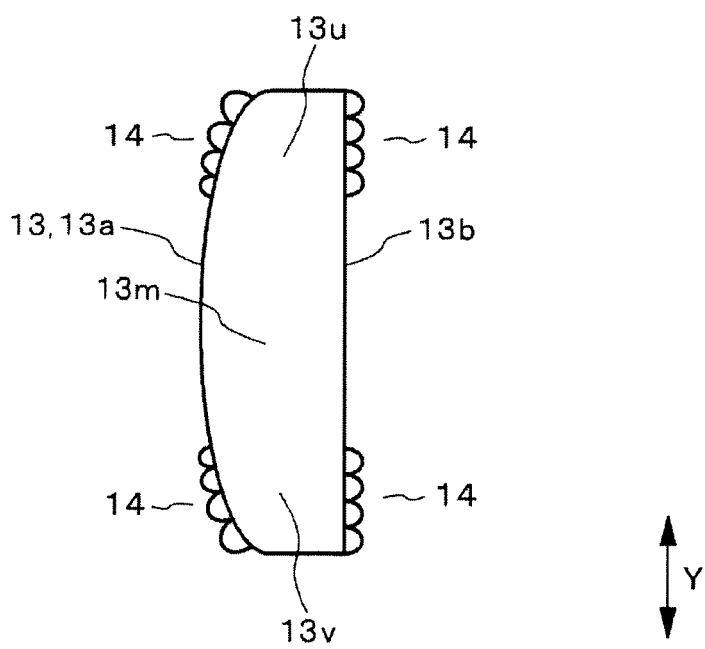

The present invention can adopt various embodiments other than the above-described embodiments. For example, the first embodiment illustrated in FIGS. 6A and 6B illustrates an example in which the light diffusion members 14 are provided at the end portions 13u, 13v of the outgoing surface 13b of the light projecting lens 13. However, the present invention is not limited to this. Besides this, a fourth embodiment illustrated in FIGS. 11A and 11B may be adopted. For example, as illustrated in FIG. 11A, light diffusion members 14 may be provided at end portions 13u, 13v of an incident surface 13a of a light projecting lens 13. Alternatively, as illustrated in FIG. 11B, light diffusion members 14 may be provided at end portions 13u, 13v of each of an incident surface 13a and an outgoing surface 13b of a light projecting lens 13. Alternatively, light diffusion members 14 each configured of a single cylindrical lens may be provided on end portions 13u, 13v of an incident surface 13a or an outgoing surface 13b of a light projecting lens 13 (not illustrated). Further, a light diffusion member 14 may be provided only on one of an upper end portion 13u and a lower end portion 13v of an incident surface 13a or an outgoing surface 13b of a light projecting lens 13 (not illustrated).

Figure 12A:
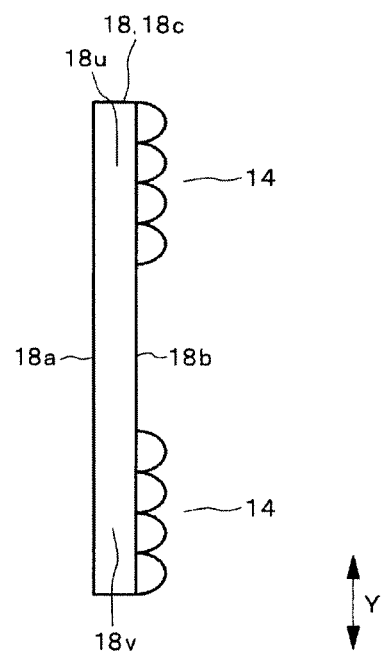
FIGS. 12A and 12B are views illustrating a transmission cover and a light diffusion member according to a fifth embodiment.
Figure 12B:
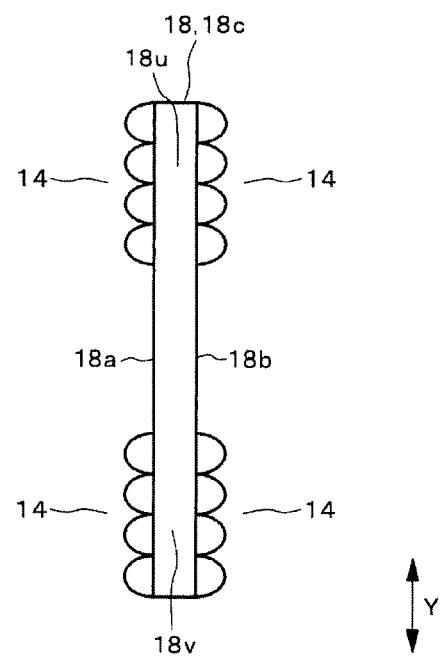

In addition, the second embodiment illustrated in FIG. 9 illustrates an example in which the light diffusion members 14 are provided at the end portions 18u, 18v of the incident surface 18a of the transmission cover 18. However, the present invention is not limited to this. Besides this, a fifth embodiment illustrated in FIGS. 12A and 12B may be adopted. For example, as illustrated in FIG. 12A, light diffusion members 14 may be provided at end portions 18u, 18v of an outgoing surface 18b of a transmission cover 18. Alternatively, as illustrated in FIG. 12B, light diffusion members 14 may be provided at end portions 18u, 18v of each of an incident surface 18a and an outgoing surface 18b of a transmission cover 18. Alternatively, light diffusion members 14 each configured of a single cylindrical lens may be provided on end portions 18u, 18v of an incident surface 18a or an outgoing surface 18b of a transmission cover 18 (not illustrated). Further, a light diffusion member 14 may be provided only on one of an upper end portion 18u and a lower end portion 18v of an incident surface 18a or an outgoing surface 18b of a transmission cover 18 (not illustrated).

In addition, the above embodiments illustrate examples in which the light projecting unit 1 includes the light projecting lens 13, the scanning mirror 3a, and the transmission cover 18 in addition to the light emitting element 11. However, the present invention is not limited to them. Any one or two of a light projecting lens 13, a scanning mirror 3a, and a transmission cover 18 may be provided.

In addition, a light diffusion member 14 may be provided on at least one of a light projecting lens 13, a scanning mirror 3a, and a transmission cover 18. Alternatively, as illustrated in a sixth embodiment of FIG. 13, a light diffusion member 14 may be provided separately from a light projecting lens 13, a scanning mirror 3a, and a transmission cover 18. In this case, a location between a light emitting element 11 and a light projecting lens 13, a location between the light projecting lens 13 and the scanning mirror 3a, and a location between the scanning mirror 3a and a transmission cover 18 are considered as locations at which the light diffusion member 14 is disposed, as indicated by broken lines in FIG. 13. The light diffusion member 14 may be disposed at at least one of these locations. Even in a case where the light diffusion member 14 is disposed separately from the light projecting lens 13 and the like as described above, the light diffusion member 14 is nevertheless provided at an end portion in the vertical direction Y of a light projecting path 10 through which measuring light travels.

Figure 14A:
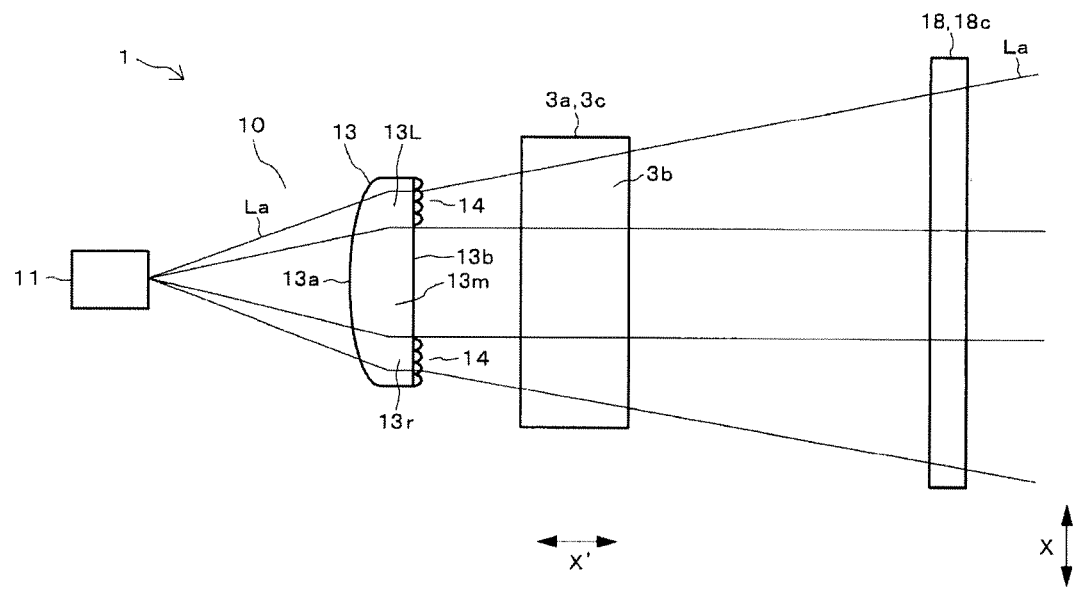
FIGS. 14A and 14B are views illustrating a light projecting unit and a light projection state according to a seventh embodiment, respectively.
Figure 14B:
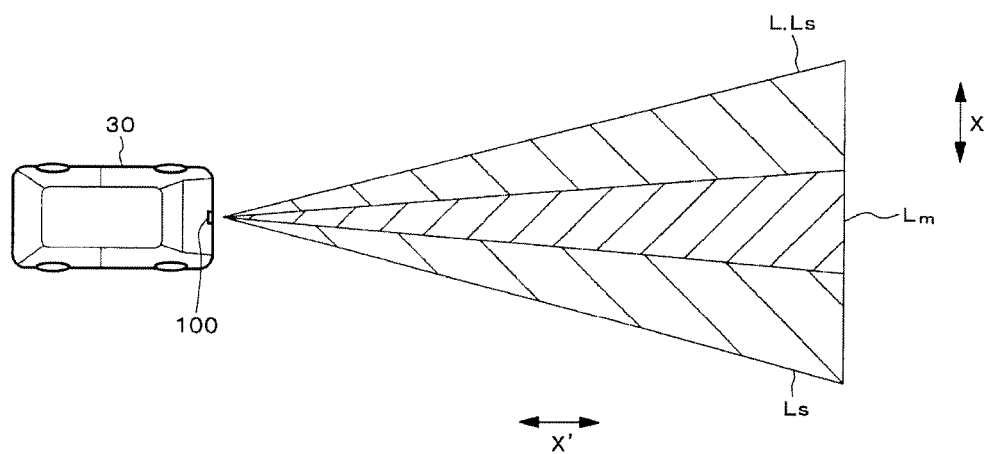

In addition, the above embodiments illustrate examples in which measuring light is diffused in the vertical direction Y. However, the present invention is not limited to them. Besides this, as illustrated in a seventh embodiment of FIGS. 14A and 14B, measuring light may be diffused in the horizontal direction X. FIGS. 14A and 14B are top views of a light projecting unit 1 and a vehicle 30.

In the example of FIG. 14A, light diffusion members 14 are provided at end portions 13L, 13r in the horizontal direction X of a light projecting lens 13 disposed on a light projecting path 10. Part of measuring light La emitted from a light emitting element 11, the part of the measuring light La traveling through end portions in the horizontal direction X of the light projecting path 10, is diffused in the horizontal direction X by the light diffusion members 14. As a result, as illustrated in FIG. 14B, a light projecting range (hatched part) of measuring light L projected in front of the vehicle 30 can be extended in the horizontal direction X. In addition, the light projection amount of measuring light Lm projected on a central portion of the light projecting range of the measuring light L is made greater than the light projection amount of measuring light Ls projected to right and left sides of the light projecting range. Therefore, detection sensitivity of a long-distance target can be increased.

Figure 13:
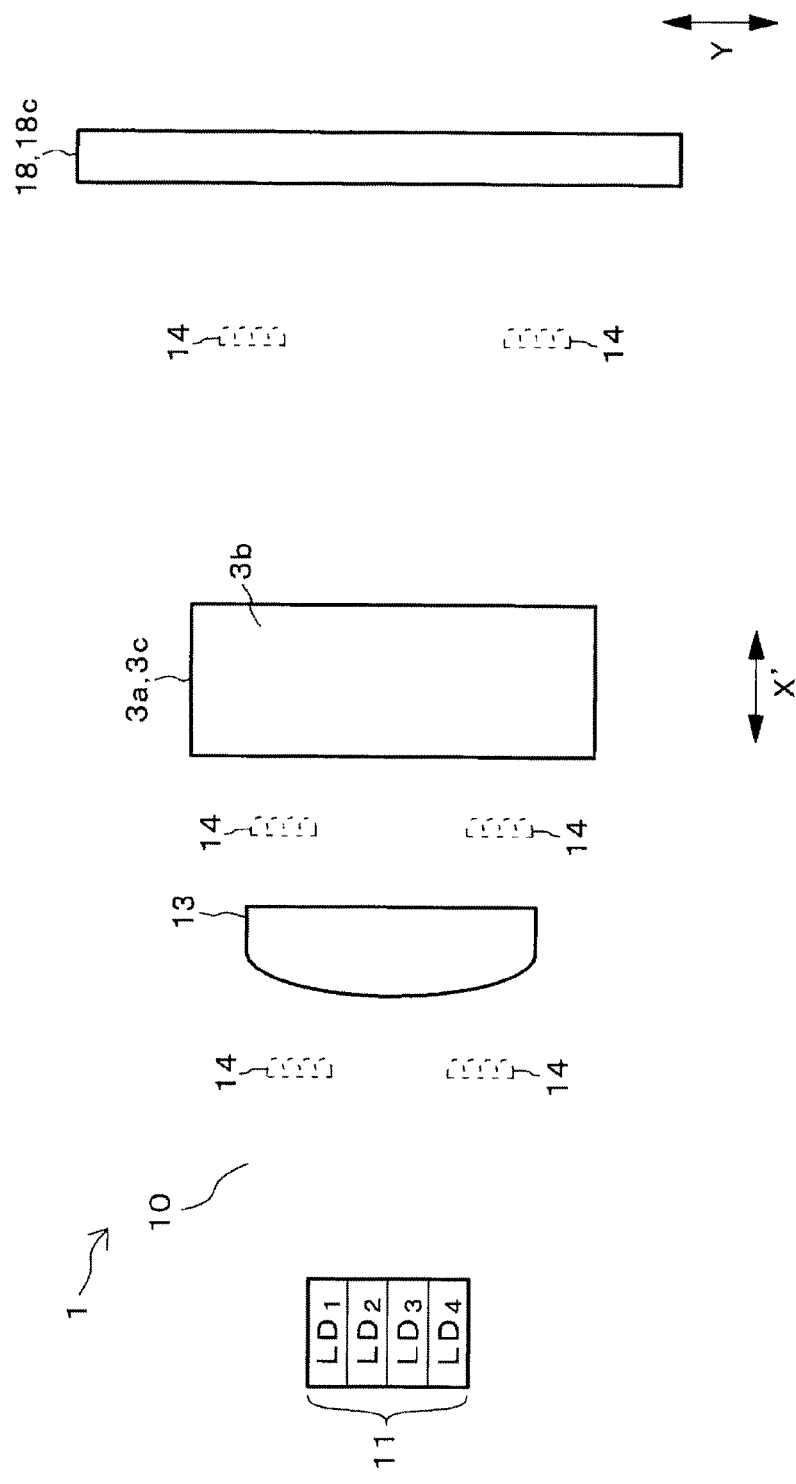
FIG. 13 is a view illustrating a light projecting unit according to a sixth embodiment.

Note that in the case of FIGS. 14A and 14B, scanning mirror 3a may be omitted. In addition, as the light emitting element 11, only one LD may be provided or a plurality of LDs may be arranged in the horizontal direction or the vertical direction. In addition, the light projecting lens 13, the scanning mirror 3a, and a transmission cover 18 in FIGS. 14A and 14B may adopt configurations of the light projecting lens 13, the scanning mirror 3a, and the transmission cover 18 illustrated in FIGS. 9 to 12B. Further, the light diffusion members 14 in FIG. 14A may be arranged separately as illustrated in FIG. 13.

In addition, as another embodiment, a light diffusion member that diffuses measuring light in the vertical direction Y and a light diffusion member that diffuses the measuring light in the horizontal direction X may be used together.

In addition, the above-described embodiments describe examples in which an LD is used as the light emitting element and a PD is used as the light receiving element. However, the present invention is not limited to these examples. A light projecting unit 1 may include a suitable number of light emitting elements other than an LD. In addition, for example, a light receiving unit 2 may include, as a light receiving element, an APD (Avalanche Photo Diode), an SPAD (Single Photon Avalanche Diode) which is a Geiger-mode APD, an MPPC (Multi Pixel Photon Counter) formed by connecting a plurality of SPADs in parallel, or the like. Further, the number and arrangement of light emitting elements and light receiving elements may be appropriately selected.

In addition, the above embodiments describe examples in which the scanning mirror 3a is used which is rotated by the motor 3f so that the direction of the reflecting surface 3b is changed, and thus performs scanning with light. However, the present invention is not limited to them. In addition to the above, for example, a scanning mirror may be used which is swung by an actuator so that the direction of a reflecting surface is changed, and performs scanning with light.

In addition, the above embodiments describe examples in which the plate-like scanning mirror 3a whose both surfaces are the reflecting surface 3b is used. However, the present invention is not limited to them. Besides this, it is also possible to use a scanning mirror whose three or more side surfaces are reflecting surfaces, such as a polygon mirror. In addition, a scanning mirror which performs scanning with measuring light from a light emitting element 11 and a scanning mirror which performs scanning with reflected light from a target 50 may be separately provided. Further, a scanning mirror may be used which performs scanning with one of measuring light from a light emitting element 11 and reflected light from a target 50 in the horizontal direction or the vertical direction.

In addition, the above embodiments describe examples in which the light projecting unit 1 is provided in the upper side in the casing 19 and the light receiving unit 2 is provided in the lower side in the casing 19. However, the present invention is not limited to them. The light projecting unit 1 may be provided in a lower side in a casing 19 and the light receiving unit 2 may be provided in an upper side in the casing 19.

In addition, the above embodiments describe examples in which the target detecting device 100 is installed so as to project and receive light to and from an area in front of the vehicle 30. However, the present invention is not limited to them. The target detecting device 100 may be installed so as to project and receive light to and from an area at the rear or a side of the vehicle 30. In addition, the installation location (front portion, rear portion, side portion) of the target detecting device 100 in the vehicle 30 may be selected as appropriate.

Further, the above embodiments describe examples in which the present invention is applied to the target detecting device 100 including the on-vehicle laser radar. However, the present invention can be also applied to a target detecting device for another intended use.

The invention claimed is:

1. A target detecting device comprising:
a light projecting unit configured to project measuring light over a predetermined range;
a light receiving unit configured to receive reflected light from a target in the predetermined range of the measuring light; and
a detector configured to detect one of the target and a distance to the target, based on a light reception signal that the light receiving unit outputs according to a light reception state,
the light projecting unit including a light emitting element configured to emit the measuring light, and a light diffusion member configured to diffuse the measuring light emitted from light emitting element while transmitting the measuring light,
the light receiving unit including a light receiving element configured to receive the reflected light,
the light projecting unit further including a scanning mirror configured to reflect the measuring light emitted from the light emitting element to perform scanning in a horizontal direction,
wherein the light diffusion member is provided at an end portion in a vertical direction of a light projecting path through which the measuring light travels, and wherein the light diffusion member is configured of a plurality of cylindrical lenses having convex curved surfaces, respectively, each of the plurality of cylindrical lenses being configured to diffuse the measuring light in the vertical direction, and
wherein the plurality of cylindrical lenses is arranged in such a manner that the convex curved surfaces of the plurality of cylindrical lenses are continuous in a wave shape in the vertical direction.

2. The target detecting device according to claim 1, wherein the light diffusion member is provided on both of an upper end portion and a lower end portion of the light projecting path.

3. The target detecting device according to claim 1, further comprising:
a casing configured to house the light projecting unit and the light receiving unit; and
a window provided on the casing so as to be open toward the predetermined range,
wherein the light projecting unit further includes at least one of
a light projecting lens configured to convert the measuring light emitted from the light emitting element into parallel light in a predetermined direction, and
a transmission cover fitted so as to close the window and configured to transmit the measuring light reflected by the scanning mirror toward the predetermined range, and
wherein the light diffusion member is provided at the end portion in at least one of the light projecting lens, the scanning mirror, and the transmission cover.

4. The target detecting device according to claim 3, wherein the light diffusion member is provided at the end portion on one of an incident surface and an outgoing surface of the measuring light in one of the light projecting lens and the transmission cover.

5. The target detecting device according to claim 3, wherein the scanning mirror has a reflecting region for light projection configured to reflect the measuring light, and a reflecting region for light reception configured to reflect the reflected light, and
wherein the light diffusion member is provided at the end portion in the reflecting region for light projection.

6. The target detecting device according to claim 5, wherein the scanning mirror performs scanning with the measuring light and the reflected light in the horizontal direction,
wherein a plurality of the light emitting elements and a plurality of the light receiving elements are arranged in the vertical direction, and
wherein the light diffusion member diffuses, in the vertical direction, part of the measuring light emitted from the plurality of light emitting elements, the part of the measuring light traveling through the upper end portion and the lower end portion of the light projecting path.

7. The target detecting device according to claim 1, wherein curvatures of the plurality of cylindrical lenses are different from each other, and the cylindrical lens located further away from a center of the light projecting path has a greater curvature.

* * * * *